United States Patent
Ams et al.

(10) Patent No.: US 8,613,421 B2
(45) Date of Patent: Dec. 24, 2013

(54) DEVICE FOR FLOW CONTROL OF LIQUID OR GASEOUS MEDIUM

(75) Inventors: Felix Ams, Kaempfelbach (DE); Peter Metternich De Oliveira, Kieselbronn (DE)

(73) Assignee: ASCO Numatics GmbH, Oelbronn-Duerr (DE)

( * ) Notice: Subject to any disclaimer, the term of this patent is extended or adjusted under 35 U.S.C. 154(b) by 329 days.

(21) Appl. No.: 13/039,544

(22) Filed: Mar. 3, 2011

(65) Prior Publication Data

US 2011/0220824 A1 Sep. 15, 2011

(30) Foreign Application Priority Data

Mar. 12, 2010 (EP) .................................... 10002599

(51) Int. Cl.
  *F16K 1/16* (2006.01)
  *F16K 1/32* (2006.01)
  *F16K 31/10* (2006.01)

(52) U.S. Cl.
  USPC ................... 251/129.2; 251/129.15; 251/228; 251/298; 251/303; 137/625.42

(58) Field of Classification Search
  USPC ......... 137/625–625.5; 251/65, 129.15, 129.2, 251/228, 298, 301, 302, 303
  See application file for complete search history.

(56) References Cited

U.S. PATENT DOCUMENTS

| | | | | |
|---|---|---|---|---|
| 4,262,824 A | * | 4/1981 | Hrynewycz | 222/450 |
| 4,574,841 A | * | 3/1986 | Hugler | 137/625.44 |
| 5,226,627 A | * | 7/1993 | Hess et al. | 251/65 |
| 5,259,415 A | * | 11/1993 | Hess et al. | 137/625.65 |
| 6,848,669 B2 | * | 2/2005 | Makino | 251/129.15 |
| 7,252,114 B2 | * | 8/2007 | Wygnanski | 137/625.44 |
| 2005/0012060 A1 | | 1/2005 | Dzialakiewicz et al. | |

FOREIGN PATENT DOCUMENTS

| | | |
|---|---|---|
| DE | 42 24 389 | 1/1994 |
| EP | 1 536 169 | 6/2005 |
| WO | 03/102454 | 12/2003 |
| WO | 2006/075162 | 7/2006 |
| WO | 2007/000321 | 1/2007 |

* cited by examiner

*Primary Examiner* — John K Fristoe, Jr.
*Assistant Examiner* — Seth W Mackay-Smith
(74) *Attorney, Agent, or Firm* — Michael J. Striker

(57) ABSTRACT

A device for the flow control of a liquid or gaseous medium has a valve element which controls at least one flow opening for the medium, and an electromagnet which actuates the valve element and has a magnetic circuit having at least one excitation coil and a solenoid armature coupled to the valve element. To markedly reduce the start-up power for the excitation coil, the solenoid armature is disposed between two diametrically opposed pole pieces located in the magnetic circuit, such that it can swivel about a swivel axis, and is designed such that it extends beyond each pole piece, leaving two air gaps. At least one permanent magnet is disposed in the solenoid armature in a manner such that the magnetic flux thereof closes by way of the pole pieces.

13 Claims, 2 Drawing Sheets

DEVICE FOR FLOW CONTROL OF LIQUID OR GASEOUS MEDIUM

CROSS-REFERENCE TO RELATED APPLICATION

The invention described and claimed hereinbelow is also described in European Patent Application EP 10002599.8 filed on Mar. 12, 2010. This European Patent Application, whose subject matter is incorporated here by reference, provides the basis for a claim of priority of invention under 35 U.S.C. 119(a)-(d).

BACKGROUND OF THE INVENTION

The present invention relates to a device for a flow control of a liquid or gaseous medium.

A known device for regulating a liquid or gaseous medium (EP 1 536 169 A1) comprises a 2/2 directional control valve having a valve element that controls a valve opening through which the medium can flow, and an electromagnet that actuates the valve element. The valve element is disposed in a valve chamber formed in a valve housing; the valve opening, which is situated between a valve inlet and a valve outlet, is formed in the valve chamber. The valve opening is enclosed by a valve seat with which the valve element interacts to close and open the valve opening. The electromagnet includes a magnetic circuit having a solenoid coil or excitation coil, an armature sleeve that accommodates the solenoid coil on the outside and is closed by an armature plug, and a solenoid armature that is guided in the interior of the armature sleeve. The solenoid armature is held, in an axially displaceable manner, in the armature sleeve using two flat springs disposed on the upper and lower end faces; together with the armature plug, the solenoid armature limits a working air gap contained in the magnetic circuit. The armature sleeve extends into the valve chamber.

The point of entry is sealed against the valve housing by a sealing ring. The valve element includes a sealing holder having a plug, which is inserted axially into the solenoid armature, and a sealing plate that is accommodated in the sealing holder and interacts with the valve seat. The closed state of the valve is brought about by a valve closing spring that acts on the solenoid armature; the valve closing spring is disposed in a blind hole in the solenoid armature, bears against the armature plug, and presses the sealing plate against the valve seat. When the electromagnet is energized, the solenoid armature is displaced axially against the spring force of the valve closing spring, and the solenoid armature lifts the valve element off of the valve seat, thereby opening the valve opening and, depending on the lift of the valve element, a larger or smaller volume of medium flows from the valve inlet via the valve chamber to the valve outlet. The valve chamber is filled continually with medium, and so the medium constantly flows around the valve element and the end face of the solenoid armature.

In the case of a known device from the initially stated type (WO 03/102454 A1), the electromagnet is retained between two approximately parallel oblong plates which are connected at one end using a non-magnetic bridge and form pole pieces of a magnetic circuit. A solenoid armature in the form of a rocker is disposed laterally next to the electromagnet, on which an arched valve element is fastened, which together with the solenoid armature can be swiveled about an axis and thereby block one or the other flow opening. The solenoid armature comprises two permanent magnets above the swivel axis, which are disposed symmetrically and on both sides relative to the center of the solenoid armature. The rocker-type solenoid armature is extended over on the ends of pole pieces on both sides of the swivel axis such that the solenoid armature can swivel out of the horizontal position, either into one oblique position or into another oblique position, in which the valve element blocks the one flow opening or the other flow opening.

Document US 2005/0012060 A1 makes known a device, in the case of which the solenoid armature is composed of an oblong, resiliently suspended element, on which an oblong membrane is retained using an elastic enclosure which can interact with allocated flow openings of valve channels which are interspaced in the horizontal direction. When the electromagnet is energized, the solenoid armature is moved out of a horizontal position into an oblique position such that an end region of the membrane blocks a flow opening, while another end region of the membrane, which is disposed laterally at a distance, opens a flow opening. When the electromagnet is de-energized, the oblong solenoid armature is moved back by way of the spring into an approximately horizontal starting position, in which the other flow opening is opened and the previously released flow opening is closed.

Document DE 42 24 389 A1 makes known a device, in the case of which the valve element is formed by an element having a T-shaped longitudinal cross section, which is tiltably supported in the valve housing where the center leg and the lateral arms of the T merge, wherein the leg is equipped with a resilient elastic closing element on both sides, which selectively closes, depending on the tilt position, one of two valve openings of the valve housing disposed at a distance on opposite sides of the leg. The elastic closing element is connected to a diaphragm that seals the valve housing against the housing containing the electromagnet.

SUMMARY OF THE INVENTION

The problem to be solved by the invention is that of providing a device for the flow control of a liquid or gaseous medium, which saves energy, i.e. requires much less electrical start-up power for the electromagnet to actuate the valve element.

According to the present invention, the swivel motion of the solenoid armature can be transferred to the valve element in a manner that is simple in terms of production engineering, and a manufacture of valve element, actuating lever, and sealing plate in a single assembly that is advantageous in terms of production engineering can be achieved, which is also economical in terms assembly. It is also advantageous that less energization of the electromagnet is required to swivel the solenoid armature compared to the axial displacement thereof, and that the presence of at least one permanent magnet in the solenoid armature results in less start-up power being required for the electromagnet to generate a magnetic force of equal magnitude that acts on the solenoid armature. The two measures result in accumulated potential for energy savings associated with the actuation of the valve element, and result in a marked reduction in start-up power for the electromagnet and in a greater magnetic force given the same functionality of the device.

The magnetic force of the at least one permanent magnet is sufficient to hold the solenoid armature in both of the end swivel positions thereof, in which the at least one flow opening is closed or opened. A separate valve closing spring can be omitted. This reduces the expenditure and contributes to the energy savings since the return force of a valve closing spring need not be overcome when the valve is opened by swiveling the solenoid armature.

According to an advantageous embodiment of the invention, a groove is contained in each of the lateral surfaces of the solenoid armature facing the pole pieces, into which the pole pieces extend and, together with the groove flanks facing them, limit the air gaps. Due to these measures, air gaps can be formed between the pole pieces and solenoid armature using a simple design.

According to an advantageous embodiment of the invention, two permanent magnets are disposed in the solenoid armature symmetrically with respect to a perpendicular line extending through the swivel axis onto the solenoid armature, and are separated from each other by a region composed of a magnetic material that encloses the swivel axis. The permanent magnets extend into the groove base of the two grooves, thereby reliably ruling out a magnetic short circuit inside the solenoid armature. The retaining force in the swivel end positions of the solenoid armature is increased by providing two permanent magnets. The arrangement of at least one permanent magnet in the solenoid armature, in combination with the closed design of the magnetic core and the pole pieces in the form of yoke legs has the advantage that no magnetic stray fields, or only slight magnetic stray fields, reach the outside.

According to an advantageous embodiment of the invention, a space composed of a magnetic material is disposed in at least one of the air gaps formed between the pole pieces and the solenoid armature, preferably in two air gaps situated diametrically to the swivel axis. By way of this spacer(s), a monostable behavior of the device can be attained since each spacer has great magnetic resistance and weakens the retaining force of the permanent magnet to the extent that, if the energization of the excitation coil is eliminated, the solenoid armature is swiveled back into the stable swivel end position by a slight return force, e.g. of a return spring, in which the solenoid armature and pole pieces rest directly against one another without the spacers being disposed therebetween.

According to an advantageous embodiment of the invention, the at least one flow opening controlled by the valve element is formed in a valve chamber disposed between valve ports of a valve housing. The valve element is disposed in the valve chamber such that it can swivel about an axis that extends approximately parallel to the swivel axis of the solenoid armature. The valve chamber is sealed against the electromagnet using a seal that functions simultaneously as a rocker pivot for the valve element. By way of these measures, medium can not reach the magnetic drive of the valve element. Corrosion in the magnet space is thereby minimized. The dead volume of the medium can be kept low in the valve region of the device. In all, the device composed of magnet part and valve part can be sealed more easily against the outside.

According to an advantageous embodiment of the invention, the at least one coupling element is designed as a leaf spring which is fastened by way of the one spring end thereof on the solenoid armature preferably on the underside of the solenoid armature facing the actuating lever, and engages, e.g. rests, by way of the spring end facing away therefrom on the actuating lever.

According to a preferred embodiment of the invention, two leaf springs are fastened symmetrically on the solenoid armature, preferably on the underside of the solenoid armature, in a manner such that they acts on the actuating lever by way of the free spring ends thereof, preferably on opposite sides thereof. The use of leaf springs as coupling element make it possible, advantageously, to compensate for tolerances between the swivel path of the solenoid armature and the swivel path of the valve element. In the embodiment of the electromagnet with monostable behavior, the leaf springs are also used to return the solenoid armature into the stable swivel position thereof if the energization of the excitation coil fails.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
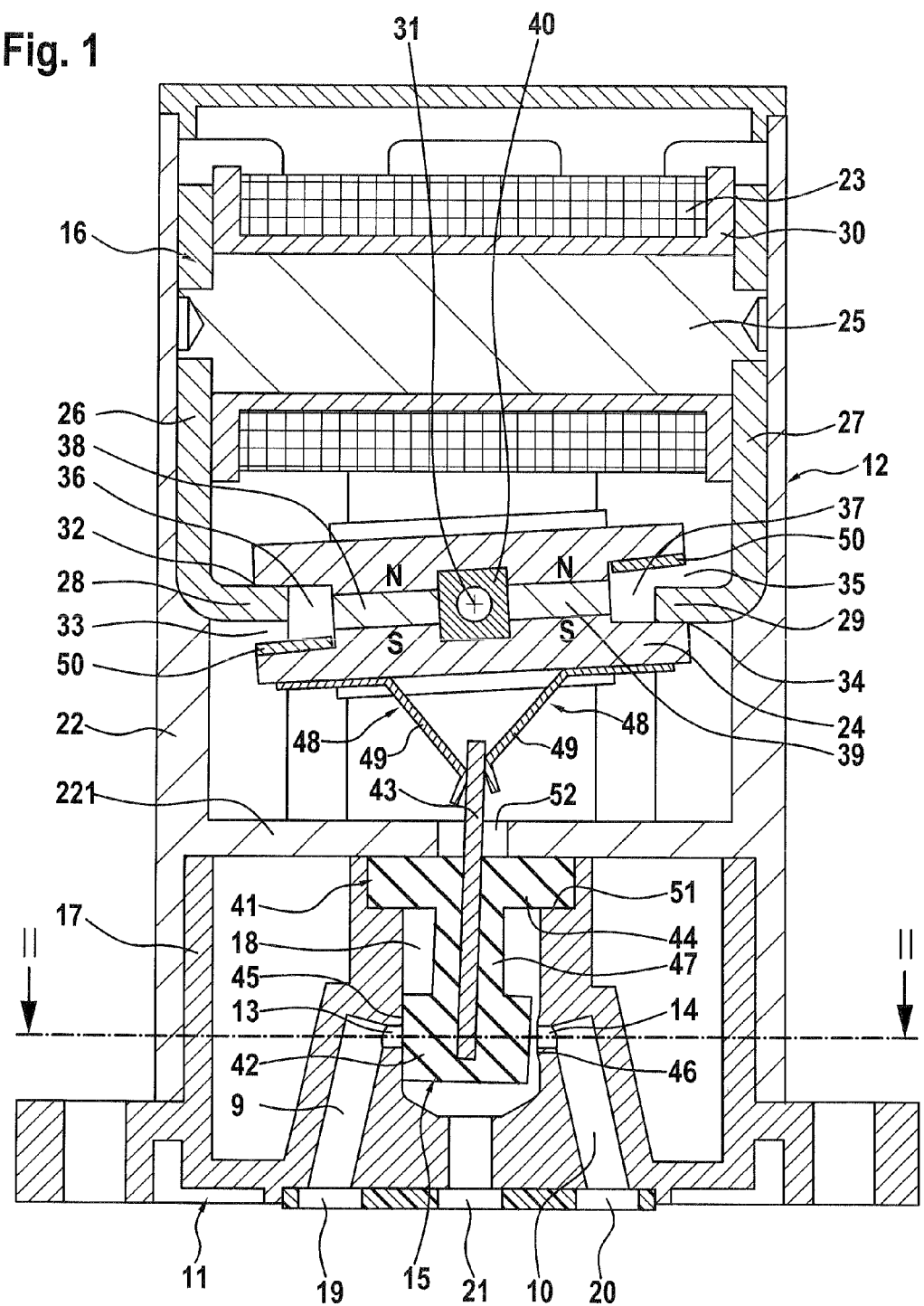
FIG. 1 shows a longitudinal sectional view of a device for the flow control of a liquid or gaseous medium in accordance with the present invention.
Figure 2:
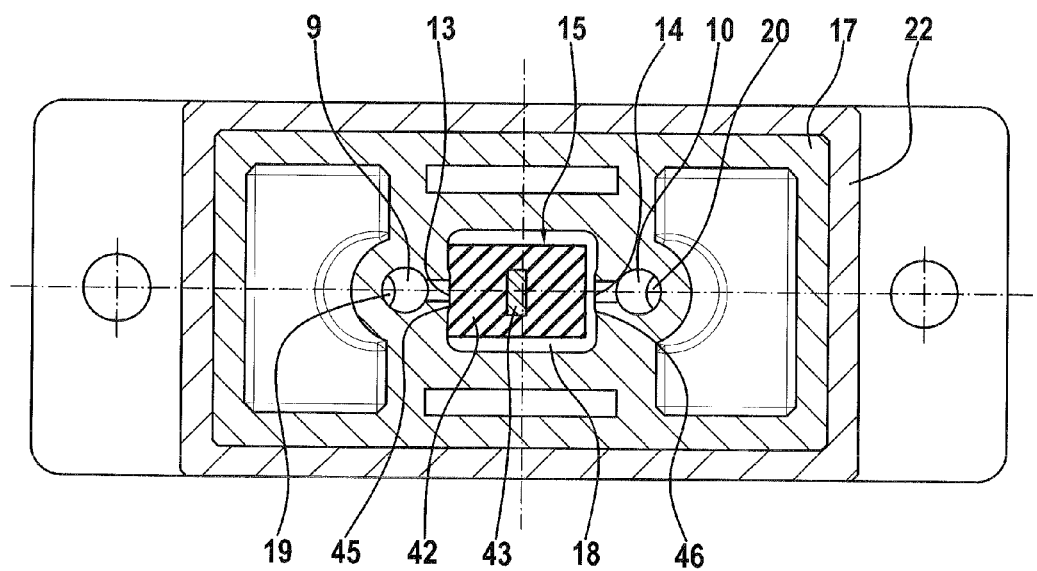
FIG. 2 shows a sectional view of the device in accordance with the present invention along line II-II in FIG. 1.

The device for the flow control of a liquid or gaseous medium, also referred to as fluid, running, or flowing medium, which is depicted as an example in a longitudinal sectional view in FIG. 1, is subdivided into valve 11 through which medium flows, for the flow control of the medium, and into an electromagnetic drive 12 which is separated from the medium. Basically, the device comprises at least one flow opening 13 for the medium, a valve element 15 which controls the at least one flow opening 13, and an electromagnet 16 which actuates valve element 15. In the embodiment shown, the valve is designed as a 3/2 directional control valve comprising two flow openings 13, 14 controlled by valve element 15. Valve 11 comprises a valve housing 17, in which a valve chamber 18 accommodating valve element 15 is formed. The two flow openings 13, 14 are formed in the chamber wall of valve chamber 18 and are each connected by way of a valve channel 9, 10, respectively, to a valve port 19 and 20, respectively, on valve housing 17. A further valve port 21, which is typically provided for the medium inflow, likewise leads into valve chamber 18.

Electromagnet 16, which is accommodated in a magnet housing 22, has a magnetic circuit having at least one solenoid or excitation coil 23 and a solenoid armature 24 which is coupled to valve element 15. The magnetic circuit comprises a magnetic core 25 and two yoke legs 26, 27, which rest against the end faces of magnetic core 25 and are angled on the ends thereof opposite the magnetic core, and form pole pieces 28, 29 situated opposite one another at a distance. Excitation coil 23 wound on a coil form 30 is slid onto magnetic core 25. Solenoid armature 24 is disposed between the two pole pieces 28, 29 of yoke legs 26, 27 such that it can swivel about a swivel axis 31. Swivel axis 31 extends e.g. transversely to the longitudinal direction of electromagnet 16, e.g. horizontally. Solenoid armature 24 is designed such that it extends beyond each pole piece 28 and 29, leaving two air gaps 32, 33 and 34, 35 between solenoid armature 24 and pole piece 28 and 29, respectively. For this purpose, a groove 36 and 37 is formed in the lateral surfaces of solenoid armature 24 facing pole pieces 28, 29, into which pole pieces 28, 29 extend and, together with the groove flanks facing them, limit aforementioned air gaps 32 to 35.

Two permanent magnets 38, 39 are disposed in solenoid armature 24 symmetrically with respect to the center line or symmetry axis of solenoid armature 24 extending through swivel axis 31, such that the magnetic flux thereof closes above pole pieces 28, 29. The two permanent magnets 38, 39 are separated from each other by a region 40 composed of a magnetic material that encloses swivel axis 31, and extend into the groove base of both grooves 36, 37. Permanent magnets 38, 39 are magnetized parallel to the center line, and therefore e.g. the north pole thereof is at the top in FIG. 1, and the south pole thereof is at the bottom in FIG. 1, as indicated by "N" and "S" in FIG. 1. The polarization direction can be rotated by 180°, of course. Basically it is sufficient to provide only one permanent magnet, e.g. permanent magnet 38, in solenoid armature 24. In this case, omitted permanent magnet 39 must be replaced by a magnetic material to prevent a magnetic short circuit of permanent magnet 38 in solenoid armature 24. However, providing two permanent magnets 38, 39 increases the retaining force between solenoid armature 24 and pole pieces 28, 29 in the two swivel end positions of solenoid armature 24.

Valve element 15, which is coupled to solenoid armature 24, is retained in valve chamber 18 such that it can swivel e.g. about an axis extending approximately parallel to swivel axis 31, wherein valve chamber 18 is sealed against magnetic housing 22 and electromagnet 16 by way of a seal 41 which is designed simultaneously as a rocker pivot for valve element 15. The swivel axis of valve element 15 is situated in the region of seal 41. Valve element 15 comprises a closing head 42 and an actuating lever 43 which carries closing head 42 and is fastened to a sealing plate 44 formed of elastic material and forming seal 41, e.g. being extended therethrough to closing head 42. Actuating lever 43 extends through an opening 52 and into magnet housing 22 by way of the end facing away from valve element 15. Sealing plate 44 is disposed in a recess 51 formed in valve housing 17 and is pressed into recess 51 by a base 221 of magnet housing 22 when magnet housing 22 and valve housing 17 are assembled.

Base 221 seals valve housing 17 tightly against magnet housing 22 and contains opening 52 for actuating lever 43. When magnet housing 22 is placed onto valve housing 17, base 221 rests on valve housing 17 and secures sealing plate 44 in recess 51, while actuating lever 43 extends through opening 52. Closing head 42 interacts with a valve seat 45 and 46, which encloses flow openings 13 and 14, respectively, to open and close flow openings 13 and 14 in alternation. Closing head 42 and sealing plate 44 can be interconnected as a single piece by way of a neck 47 having a smaller diameter. Valve element 15 comprising closing head 42, neck 47, and sealing plate 44 can be formed as a single piece out of soft elastic material, on which actuating lever 43 securely engages. It can be enclosed by this material, e.g. by way of a coating applied using injection molding.

The swivel motion of solenoid armature 24 is transferred to actuating lever 43 of valve element 15 by way of at least one coupling element 48 designed as leaf spring 49 in the embodiment. Leaf spring 49 is attached by way of the one spring end thereof to solenoid armature 24, preferably on the underside of solenoid armature 24 facing actuating lever 43, and engages by way of spring end thereof facing away therefrom on actuating lever 43. In the embodiment shown, two coupling elements 48 are provided, which are designed as identically configured leaf springs 49. The two leaf springs 49 are fastened symmetrically on solenoid armature 24, preferably on the underside thereof, and press by way of the spring ends thereof opposite the solenoid armature against oppositely facing sides of actuating lever 43. If the coupling between solenoid armature 24 and actuating lever 43 is established using a single leaf spring 49, the end of leaf spring 49 opposite the solenoid armature is securely connected to actuating lever 43.

The device operates as follows:

In the swivel end position of solenoid armature illustrated in FIG. 1, the magnetic flux of permanent magnets 38, 39, which exists when permanent magnets 38, 39 are polarized as indicated, flows over the upper part of solenoid armature 24, over pole piece 28, yoke leg 26, magnetic core 25, yoke leg 27, pole piece 29, and the lower part of solenoid armature 24. Valve element 15 is swiveled accordingly by way of leaf springs 49 and presses by way of closing head 42 thereof against valve seat 45 of flow opening 13. Valve port 19 is closed. The medium can flow only from valve port 21 through open flow opening 14 to valve port 20.

If an excitation current is applied to excitation coil 23 in the appropriate direction, a magnetic flux generated thereby flows from magnetic core 25 over yoke leg 26, pole piece 28, thereby producing a north pole on pole piece 28, air gap 33, the lower part of solenoid armature 24, air gap 34, pole piece 29, and yoke leg 27 to magnetic core 25. The magnetic resistance of air gap 33 is overcome. Solenoid armature 24 is drawn toward pole piece 28. The north poles repel each other, and the north/south poles attract each other. Solenoid armature 24 swivels in the clockwise direction into the other end position thereof, wherein actuating lever 43 of valve element 15 is swiveled by leaf spring 49 in the counterclockwise direction. Due to the swiveling point through sealing plate 44, closing head 42 of valve element 15 lifts away from the side of valve seat 45. It is pressed against the other valve seat 46. Flow opening 13 is opened and flow opening 14 is closed. Valve port 20 is blocked, and medium flows through valve port 21 and valve port 19. The magnetic flux of permanent magnets 38, 39 ensures that retaining forces are adequate even in this swivel end position, and therefore this swivel end position of solenoid armature 24 is also stable.

If the aim is to return solenoid armature 24 to the swivel end position thereof shown in FIG. 1, a current having the opposite polarity is applied to excitation coil 23. The magnetic flux generated as a result in the magnetic circuit extends from magnetic core 25 over yoke leg 27, pole piece 29, air gap 33, pole piece 28, and yoke leg 26 to magnetic core 25. The magnetic resistance of air gap 34 is overcome, and the polarity that occurs on pole piece 29 attracts solenoid armature 24, thereby returning it to the swivel end position indicated in FIG. 1. The retaining forces of permanent magnets 38, 39 ensure that solenoid armature 24 has a stable end position in this case as well. Closing head 42 of valve seat 46 is swiveled back in the clockwise direction by swiveling solenoid armature 24 by way of actuating lever 43, is lifted off of valve seat 46 and pressed onto valve seat 45.

If the aim is to attain a monostable behavior of the device, an a magnetic spacer 50 is disposed in at least one of the air gaps 32 to 35 formed on pole pieces 28, 29. In the embodiment shown, two a magnetic spacers 50 are disposed in two air gaps 33, 35 situated diametrically relative to swivel axis 31. Spacers 50 are attached to groove flanks of grooves 36, 37. As an alternative, spacers 50 can also be fastened onto the surfaces of pole pieces 28, 29 limiting air gaps 33 and 35, respectively. The swivel end position of solenoid armature 24 illustrated in FIG. 1 is the stable end position thereof. As described above, to swivel into the other end position, excitation coil 23 is energized in a suitable manner, and therefore solenoid armature 24 transitions into the other swivel end position thereof, in which valve element 15 opens flow opening 13 and closes flow opening 14. In this swivel end position, solenoid armature 24 rests against pole pieces 28, 29 by way of spacers 50. Due to the great magnetic resistance of spacers 50, the magnetic retaining force of permanent magnets 28, 29 is very low, and if the energization of excitation coil 23 is eliminated, leaf springs 49 return solenoid armature 24 to the stable swivel end position thereof depicted in FIG. 1.

It is also possible, of course, to design valve 11 as a 2/2 directional control valve. In this case, flow opening 14 in valve chamber 18, and valve port 20 on valve housing 17 are omitted. The flow of medium through valve 11 is blocked or released by closing and opening flow opening 13.

It will be understood that each of the elements described above, or two or more together, may also find a useful application in other types of constructions differing from the types described above.

While the invention has been illustrated and described as embodied in a device for the flow control of a liquid or gaseous medium, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A device for a flow control of a liquid or a gaseous medium, comprising:
    a valve element controlling at least one flow opening for the medium;
    an electromagnet actuating said valve element and having a magnetic circuit with at least one excitation coil and a solenoid armature coupled to said valve element and disposed between two diametrically opposed pole pieces located in the magnetic circuit such that said solenoid armature is swivelable about a swivel axis and extends beyond each of said pole pieces leaving two air gaps;
    at least one permanent magnet disposed such that its magnetic flux closes by said pole pieces, wherein said valve element has a closing head interacting with a valve seat that encloses said flow opening to close and open said flow opening; and
    an actuating lever on which said closing head is mounted and which is connected as a single piece to a sealing plate composed of an elastic material and forming a seal, and also connected by at least one coupling element to said solenoid armature, wherein said closing head and said sealing plate are interconnected as a single piece, wherein said at least one coupling element is a leaf spring having one spring end attached to said solenoid armature and another opposite spring end engaging on said actuating lever.

2. The device as defined in claim 1, wherein said actuating lever is guided through said sealing plate.

3. The device as defined in claim 1, wherein said closing head and said sealing plate are interconnected by a neck having a smaller diameter.

4. The device as defined in claim 3, wherein said valve element which is formed of said closing head, said neck and said sealing plate is formed as a single piece out of soft elastic material, on which said actuating lever engages.

5. The device as defined in claim 4, wherein said actuating lever is securely enclosed by the material.

6. The device as defined in claim 1, further comprising a second leaf spring, said leaf springs being attached to said solenoid armature such that they act by said opposite spring ends on said actuating lever.

7. The device as defined in claim 6, wherein said leaf springs are arranged so that they act on said actuating lever on its opposite sides.

8. A device for a flow control of a liquid or a gaseous medium, comprising:
    a valve element controlling at least one flow opening for the medium;
    an electromagnet actuating said valve element and having a magnetic circuit with at least one excitation coil and a solenoid armature coupled to said valve element and disposed between two diametrically opposed pole pieces located in the magnetic circuit such that said solenoid armature is swivelable about a swivel axis and extends beyond each of said pole pieces leaving two air gaps;
    at least one permanent magnet disposed such that its magnetic flux closes by said pole pieces, wherein said valve element has a closing head interacting with a valve seat that encloses said flow opening to close and open said flow opening; and
    an actuating lever on which said closing head is mounted and which is connected as a single piece to a sealing plate composed of an elastic material and forming a seal, and also connected by at least one coupling element to said solenoid armature, wherein said closing head and said sealing plate are interconnected as a single piece,
    wherein said solenoid armature has lateral surfaces facing said pole pieces and each provided with a groove, said pole pieces being engaged in said grooves and, together with groove flanks facing said pole pieces, limiting said air gaps.

9. The device as defined in claim 8, further comprising another permanent magnet, said permanent magnets being disposed on said solenoid armature symmetrically with respect to a center line of said solenoid armature, extending through said swivel axis of said solenoid armature and being separated from each other by a region composed of a magnetic material that encloses said swivel axis and extends into a groove base of said grooves.

10. The device as defined in claim 8, further comprising a magnetic spacer disposed in at least one of said air gaps formed on said pole pieces.

11. The device as defined in claim 10, and further comprising a spacer fastened on an element selected from the group consisting of the pole piece and a groove flank in said air gaps situated diametrically with respect to said swivel axis.

12. The device as defined in claim 8, wherein said at least one flow opening is formed in a valve chamber disposed between valve ports of a valve housing, said valve element being disposed in said valve chamber such that it is swivelable about an axis, and said valve chamber is sealed against said electromagnet with a seal which is simultaneously configured as a rocker pivot for said valve element.

13. The device as defined in claim 12, wherein said valve element is disposed in said valve chamber such that it is swivelable about said axis which extends substantially parallel to said swivel axis of said solenoid armature.

* * * * *